United States Patent [19]

Christianson et al.

[11] 4,024,448

[45] May 17, 1977

[54] ELECTRIC VEHICLE BATTERY CHARGER

[75] Inventors: Clinton C. Christianson, Minnetonka; Gene J. Seider, Bloomington, both of Minn.

[73] Assignee: Gould Inc., Rolling Meadows, Ill.

[22] Filed: Dec. 29, 1975

[21] Appl. No.: 645,265

Related U.S. Application Data

[63] Continuation of Ser. No. 176,559, Aug. 31, 1971, abandoned.

[52] U.S. Cl. .................................. 320/23; 320/37; 320/39; 320/51
[51] Int. Cl.² ............................................ H02J 7/00
[58] Field of Search .................. 320/39, 40, 37, 38, 320/4, 21, 31, 32, 22–24, 51; 323/44, 45, 6

[56] References Cited

UNITED STATES PATENTS

| 3,086,159 | 4/1963 | Daly | 320/51 X |
| 3,217,225 | 11/1965 | Gottlieb et al. | 320/31 UX |
| 3,293,537 | 12/1966 | Sola | 323/6 |

FOREIGN PATENTS OR APPLICATIONS 462,462  3/1937  United Kingdom ............... 320/4

Primary Examiner—Robert J. Hickey
Attorney, Agent, or Firm—Leydig, Voit, Osann, Mayer & Holt, Ltd.

[57] ABSTRACT

A battery charger contains a transformer designed to automatically provide the finish charging current to the battery being charged at the desired levels. Control circuitry can be included in combination with the charging circuit to maintain the desired finish charging current for a predetermined period of time to bring the battery up to full charge.

9 Claims, 6 Drawing Figures

INVENTORS
CLINTON C. CHRISTIANSON
GENE J. SEIDER

ELECTRIC VEHICLE BATTERY CHARGER

CROSS REFERENCES TO RELATED APPLICATIONS

This is a continuation of application Ser. No. 176,559, filed Aug. 31, 1971, now abandoned.

BACKGROUND OF THE INVENTION

1. Field of the Invention

Although the teaching of this invention may be used for a battery charger for a variety of storage batteries, it is specifically directed toward use with motive power batteries such as those used in riding lawn mowers, garden tractors, golf carts and other electrically driven vehicles. The batteries in vehicles of this nature ordinarily can only be used for a relatively short period of time and then must be recharged to get them ready for the next period of use. Typical is the case of an electric golf cart in which the battery can be used for one or possibly two rounds of golf and then must be recharged, generally overnight, to get ready for use on the next day. This must continue day after day throughout the golf season in order to keep the cart in use. However, even after the golf season, when the carts are not in daily use, it is advisable to periodically give the batteries some amount of charge to prevent them from self-discharging in storage.

2. Description of the Prior Art

Although storage batteries have been popularly used for a long period of time, there are still a number of problems that are encountered in trying to keep them in good working condition by charging. The following are some of the factors responsible for the problems. For one, after a battery has been in use for awhile and has undergone a number of recharges, it may still be useful but its characteristics will be significantly different from its characteristics when it was new. Another factor is that the battery characteristics are significantly different under different environmental conditions and particularly at different temperatures. Still another factor is that ordinary storage batteries and chargers, such as those used for electrically powered vehicles as the present invention is principally concerned with are used under all kinds of conditions and environments so that the battery chargers necessary to keep the vehicles in operation should be rugged and simple.

On the one hand, it is often desirable to charge a battery with a fairly heavy charging current in order to speed up the charging rate. This may, and often does, result in severe overcharge with resulting damage to the battery in the form of corrosion of the plates and excessive gassing which loosens active material. It could also lead to elevated temperatures in the battery which can be damaging to the battery structure. On the other hand, a charging current that is too low may and often does result in the battery being undercharged and therefore the cells have a tendency to lose capacity.

To overcome the conflict between charging at too high of a rate and charging at too low of a rate, there has been developed a number of battery chargers incorporating quite elaborate control circuits for continually monitoring the charge status of a battery under charge and varying the charging current accordingly. These types of battery chargers generally have to incorporate sophisticated and highly complex electronic circuitry. Not only are they costly, but are also not favored by the user because of their complexity. The present invention provides a simple yet rugged battery charger for a storage battery used in electric vehicles which will autontmically provide the finish charging current in the desired narrow range, regardless of the age of the battery or the temperature at which it is being charged.

SUMMARY OF THE INVENTION

The battery charger of this invention utilizes a transformer-rectifier power charging circuit. The transformer windings are constructed to provide proper leakage reactance to yield the desired voltage-current characteristics for correctly charging the battery. This is accomplished by controlling the coupling between the primary and secondary windings. As a further embodiment of the invention, control circuitry is provided to control the amount of time that the battery is under charge during the finishing charge period. This includes a circuit for sensing the charged status of the battery and a timing device to control the length of time of the charge.

DESCRIPTION OF THE PREFERRED EMBODIMENTS

Figure 1:
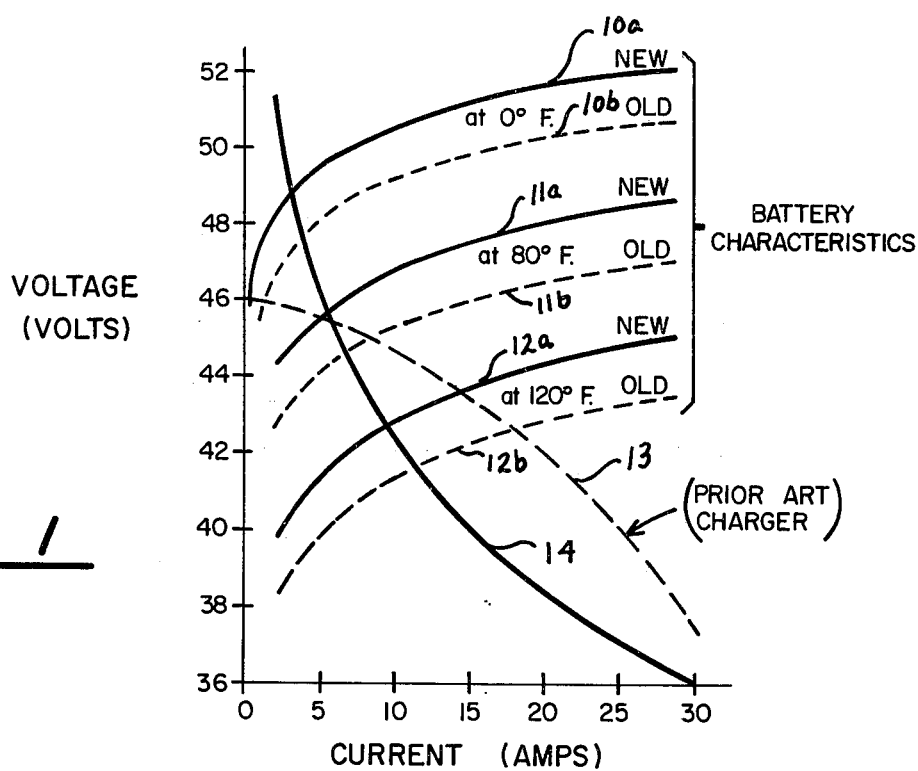
FIG. 1 is a graphic illustration of battery voltage-ampere characteristics for a variety of batteries at different temperatures and the characteristics of prior art battery chargers and the instant invention.

FIG. 1 shows the voltage-ampere characteristic curves for some typical batteries and for battery chargers as they appear at the finishing portion of the charging cycle. In other words, only those portions of the respective characteristic curves are shown where the battery is approaching and reaches the voltage level and the ampere-hour capacity to which it should be charged. It is generally accepted in the art that the finishing level starts at the point where the battery has reached about 90% of its full charge voltage and/or ampere-hour capacity. The lower end of the characteristic curves, i.e., that portion showing the characteristics up to the start of the finishing charge, are of no great moment because that which takes place in the finishing charge area is much more critical. The instant invention is concerned with this most critical aspect of battery charging. The voltage-current characteristic curves for a new and an old battery are shown for each of three different temperature levels, 0° F., 80° F. and 120° F. Curves 10a, 11a and 12a are the characteristic curves for a new battery at 0° F., 80° F. and 120° F. respectively, and curves 10b, 11b, and 12b show the voltage-ampere characteristic for an old or used battery at the same respective temperatures. It can then be seen that the age and the temperature have a pronounced effect on the battery characteristics. As pointed out earlier, for proper charging it is of utmost importance that a suitable finishing charge current be applied. The finishing charge current is that which is supplied to the battery being charged during the finishing charge period. It should be kept in mind that the proper finishing charge current ensures that the battery will not be undercharged or overcharged, although some controlled amount of limited overcharge is usually desirable. It is generally accepted in the art that the desired finishing charging current is about 5% of the 6 to 8 hour capacity of the battery at its fully charged condition. For example, if a battery is rated as having a 6-hour capacity of 180 ampere-hours, its finishing charge current should be in the order of about nine amps.

Curve 13 illustrates a characteristic curve for a typical prior art charger. Generally, the prior art chargers have utilized a ferroresonant power curcuit which attempts to approach a constant voltage characteristic. Curve 14 illustrates the characteristics of the battery charger designed according to the instant invention. In FIG. 1, the final charging current produced by the battery charger is determined from the intersection of the battery charger characteristic curve and the corresponding battery characteristic curve. Taking, for example, curve 11a which is for a new battery at 80° F., a prior art charger having a characteristic as that illustrated by curve 13, would provide a finish charge current of around 5 amperes which is acceptable. However, using this same prior art charger under different circumstances, such as with a battery represented by characteristic curve 12b, the final charge current would be in the order of 18 amperes which is quite excessive and would result in increased water consumption, increased battery temperature and other harmful effects. Carrying this further, it can be seen that according to curve 10a, a new battery at 0° F. will receive a final charge current of a very small value in the order of about 0.4 amp. This will result in dramatic undercharge with resulting poor battery performance and probably faster deterioration of the battery.

Referring to curve 14, which is the characteristic curve of battery charger designed according to the instant invention, it can be observed that for the old and new batteries at the various depicted temperature levels, the finish charging current ranges from a low of about 4 amps for a new battery at 0° F. to an upper level in the order of about 11 amperes for an old battery at 120° F. Because the battery charger operates to produce finish charging current over a much narrower range than has been provided heretofore by prior art chargers, the problem of overcharging or undercharging because of incorrect finish charging current for batteries under different circumstances has been eliminated.

Figure 2:
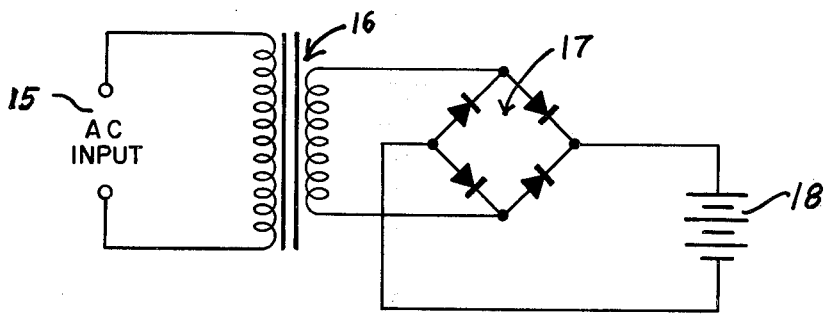
FIG. 2 is a schematic diagram of an embodiment of the present invention.
Figures 3A, 3B:
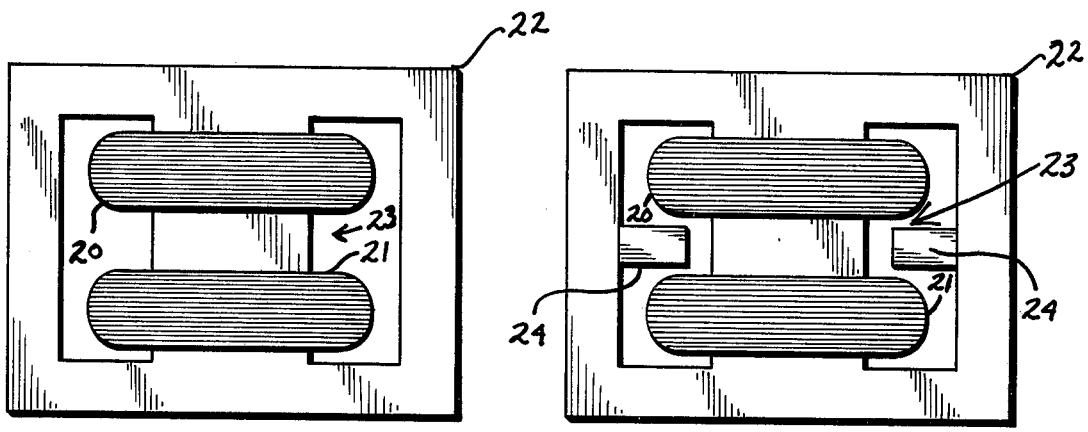
FIGS. 3a and 3b illustrates the winding arrangement in the transformer used in the instant invention.

Turning next to FIG. 2, the simplicity of the electrical schematic arrangement of a preferred embodiment of the invention is illustrated. There is shown an AC power input 15 for providing energy in the order of 115 to 120 volts at 60 hz, feeding the primary of transformer 16 which has its secondary connected across a full wave rectifier circuit 17. The output of the rectifier circuit 17 is fed to the battery 18 being charged. The physical arrangement of the primary and secondary windings of transformer 16 is illustrated in FIGS. 3a and 3b. In FIG. 3a primary 20 and secondary 21 are wrapped around a laminated iron core 22 with windings parallel in face to face relationship and separated by an air gap 23 to provide the desired amount of leakage reactance. The turns ratio is selected to provide the desired amount of voltage and current output from the secondary winding for the particular type of battery being charged. In FIG. 3b primary and secondary windings 20 and 21 respectively, are also separated by an air gap 23. However, here a piece of magnetic material 24 is introduced into the air gap to change the degree of coupling between the two windings and correspondingly affect the leakage reactance. A transformer with windings coupled in the manner illustrated in FIG. 3b, will reach magnetic saturation at some finite current value. The result is that the charger characteristic will have a sharp knee in its characteristic curve. This will automatically provide the desired charging characteristics of larger current during the initial charging period and a reduced but substantially steady final charging current as the battery approaches full charge.

A typical transformer for use in the battery charger circuit of FIG. 2 was constructed with a primary winding of approximately 250 turns, secondary winding of approximately 94 turns on a laminated iron core AISI grade N-6/A-L grade 66 with the laminations stacked to a height of about 1.2 inches and the spacing between the windings in the order of 0.400 inches. Measurements taken when testing the battery charger using the transformer as above described and with a 117 volt 60 hz power source were as follows:

a. Battery charged to 36 volts, charging current in the order of 10.8 to 11.4 amps;
b. Battery charged to 42 volts, charging current in the order of 5.8 to 6.4 amps;
c. Battery charged to 50 volts, charging current in the order of 1.8 to 2.2 amps.

Ordinarily, battery chargers have been equipped with timing devices so that the battery is kept on charge for a prescribed period of time. As pointed out earlier, under different temperature conditions and for batteries of different ages, the length of time that the battery should be charged to bring it up to its full charge capacity may be different. The present invention contemplates having in combination with the charger designed to produce the desired finish charging current, circuit means for allowing the battery to be charged for a specific period of time after it reaches a certain charge level. Becuase the battery charger as described above, provides finishing charging current within a fairly narrow range, it is safe to allow the battery to be charged for a prescribed period of time after it reaches a certain level without fear of overcharging or undercharging which was the case with prior art chargers.

Figure 4:
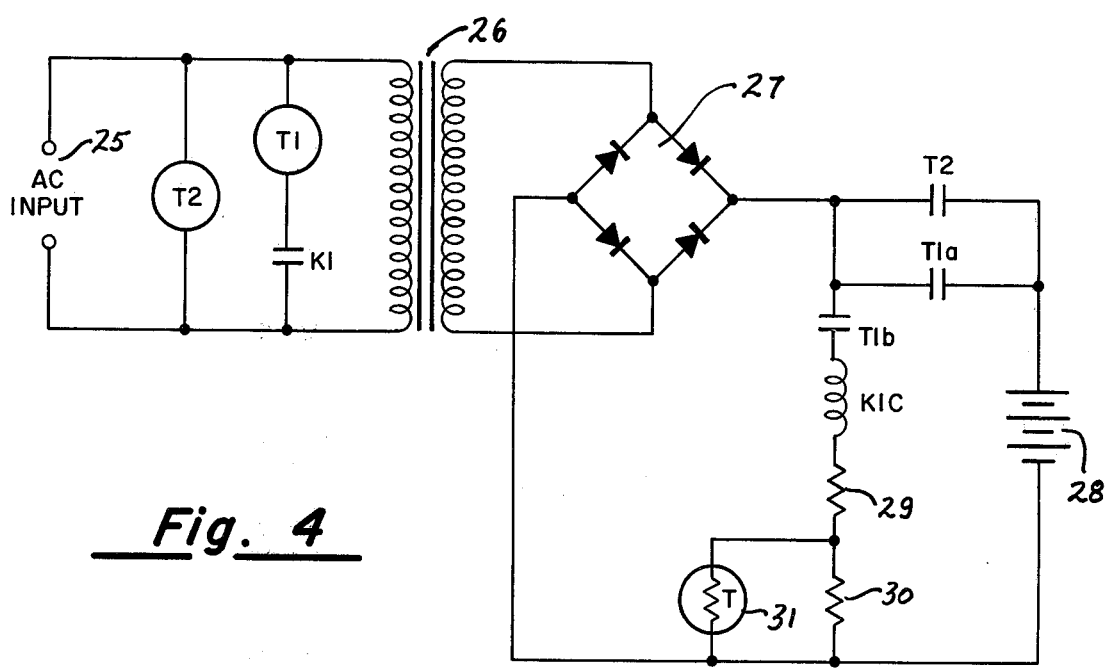
FIG. 4 is a schematic diagram of another embodiment of the invention.

FIG. 4 schematically illustrates a circuit for controlling the charging time. The charging energy is provided by the AC input source 25 which feeds a transformer 26 which is constructed along the lines previously described. The secondary of the transformer 26 is applied across the full wave rectifier 27. Ignoring for the moment timer T2 which is connected across the primary of transformer 26 and its associated switch contact which is connected from the output of full wave rectifier 27 to the battery 28 being charged, a timer T1 is connected in series with relay contact K1 across primary 26 and the input source 25. A first switch contact T1a associated with timer T1 is in series with battery 28 and the output of the full wave rectifier 27. A second switch contact T1b associated with timer T1 is in series with relay coil K1c and resistors 29 and 30 across the output of the full wave rectifier 27. In parallel with resistor 30 is a thermistor 31. The latter is to provide sensor circuit temperature compensation closely matched to the battery voltage variations, thus changing circuit operation with wide variations in temperature.

The circuit operates in the following manner. The operator manually sets timer T1 and in doing so, switch contacts T1a and T1b are closed. Assuming battery 28 is in the discharged condition so that its voltage is quite low, it will be charged by energy from the source 25 through the transformer and full wave rectifier 27 with the charging current passing through now closed contact T1a. The relay coil K1c is selected so that it will not energize until the potential of battery 28 reaches a predetermined level which generally is in the order of 80% to 90% of its fully charged voltage state. When this occurs, the relay coil energizes thereby closing relay contact K1 in series with timer T1 so that the latter energizes and starts its timing operation. The length of time is preset and is based upon characteristics of the battery being charged. When timer T1 has run through its preset time, it then opens contacts T1a and T1b thereby removing any further charging current from battery 28. At the same time, the relay coil K1c becomes de-energized to open contact K1 so that timer T1 is de-energized. To reset the circuit to its operational state, it is necessary for the operator to again reset timer T1 and then the same procedure as previously described is repeated.

Timer T2 and its associated switch contact serve a somewhat different purpose. Timer T2 can be set to function for a short period of time automatically at periodic intervals. For example, if the battery is being unused for some period of time it is desirable to occasionally give it a small amount of charge to keep it from deteriorating by self-discharge. Timer T2 may be provided to operate once a day for about 10 to 15 minutes so that contact T2 will close and charging energy will be supplied to battery 28 for that limited period of time until timer T2 automatically terminates and until it resets automatically the following day. This type of automatic battery charge maintenance is possible only because it is used in combination with a charger that produces a correct finish charge current so there is no danger of overcharging or overheating the battery or that it will not receive enough of a charge.

Figure 5:
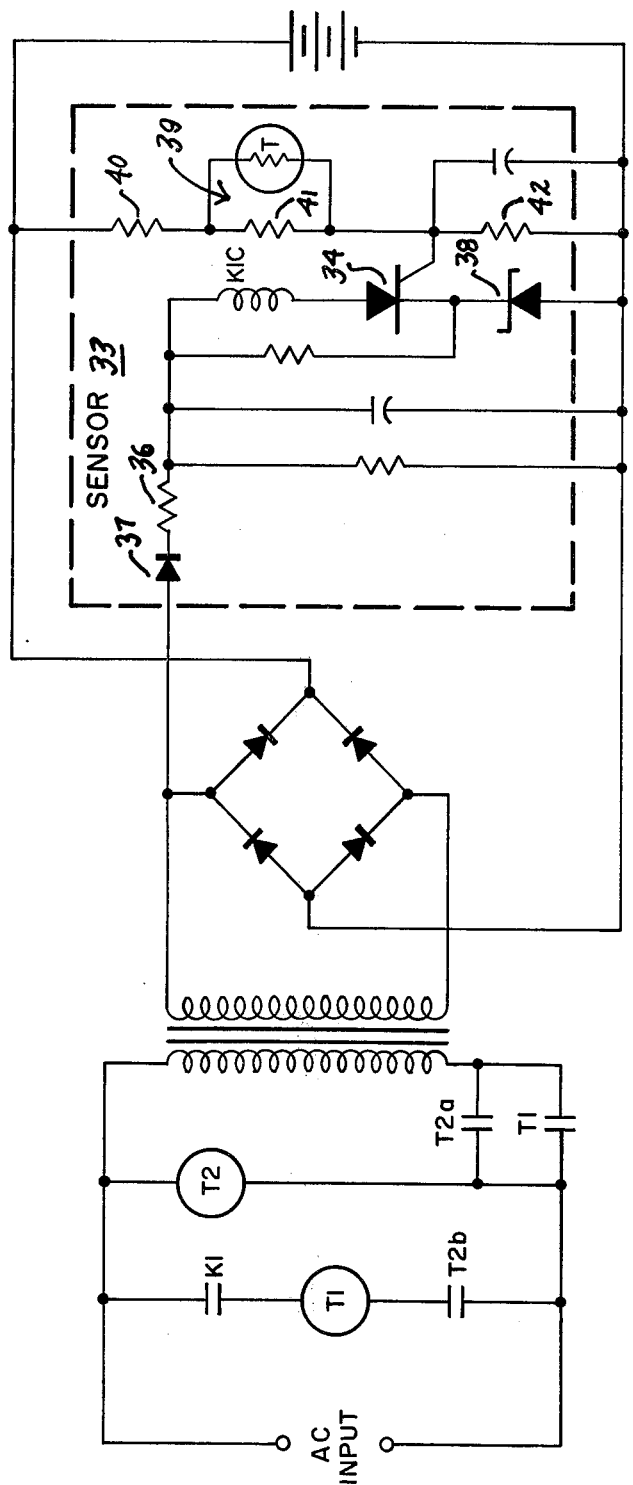
FIG. 5 is a schematic diagram of still another embodiment of the invention.

A somewhat more elaborate system is illustrated in FIG. 5. A sensor circuit 33 contains a thyristor 34, relay coil K1c in series with a resistor 36 and a diode 37 connected back to one side of the transformer secondary. The cathode element of thyristor 34 is connected to a reference potential through a reference or Zener diode 38. The control electrode of the thyristor 34 is connected to a voltage divider network consisting of three resistors 40, 41 and 42, connected across the battery being charged. Again, it can be assumed that timer T2 and its associated switch contacts are not in the circuit. During the initial period of charge, thyristor 34 remains in the off condition because the battery voltage is low. When the level of the battery voltage is high enough so that the signal at the control electrode of the thyristor is above the reference potential established by diode 38, the thyristor is turned on and energizes relay coil K1c. This closes contact K1 to start the previously set timer T1. The battery continues to be charged and thyristor 34 continues to conduct until timer T1 runs out at which time switch contact T1 in series with the transformer primary opens removing energy from the transformer to terminate the charging cycle. A thermistor-resistor combination 39 provides temperature compensation to again match the battery voltage variations. After the power has been removed in the manner described, timer T1 has to be manually reset before another battery charge. Timer T2 with its associated switch contacts T2a and T2b is used for a periodic short term maintenance charging as described earlier with relation to FIG. 4.

It should be noted that an electronic relay, such as a silicon controlled rectifier, could be used in place of the mechanical relay K1.

We claim:

1. A charging circuit for a storage battery, comprising in combination: an AC source of charging energy; rectification means coupled to a battery under charge for supplying pulsating DC charging energy to said battery; and a transformer for coupling said AC energy source to said rectification means, said transformer having leakage reactance such that the transformer in combination with the rectification means and the battery produces a large charging current during the initial charging period and a finishing charging current decreasing non-linearly at a continuously decreasing rate as a function of increasing battery charging voltage so that a finishing charging current of about 5% (in amperes) of the capacity of the battery under charge is supplied to the battery regardless of the age or temperature of the battery.

2. A charging circuit for a storage battery, comprising in combination: an AC source of charging energy; rectification means coupled to a battery under charge for supplying pulsating DC charging energy to said battery; and a transformer for coupling said AC energy source to said rectification means, said transformer having leakage reactance for producing charging current to the battery from the rectification means as characterized by curve 14 in FIG. 1.

3. The charging circuit as set forth in claim 1 wherein the transformer is characterized by the turns ratio and the inductive coupling between primary and secondary windings being such as to produce the finish charging current to the battery in the range of about 5% of the 6 to 8 hour capacity of the battery ampere-hour rating.

4. The charging circuit as set forth in claim 3 wherein the primary and secondary windings of the transformer are wound around a common core and are separated from one another by a substantial air gap to produce the desired leakage reactance.

5. The charging circuit as set forth in claim 4 wherein the air gap contains in part magnetic material for controlling the leakage reactance.

6. The invention as set forth in claim 1 further including; means for sensing the charge condition of the battery; and means coupled to the charging circuit responsive to said sensing means for controlling the amount of time the finishing charge current is applied to the battery.

7. The invention as set forth in claim 6 wherein said controlling means comprises: timing means; switch means located in circuit between the charging energy source and the battery; said switch means being operated in response to said timing means to stop the flow of charging energy to the battery at a predetermined time.

8. The invention as set forth in claim 6 wherein said sensing means includes controlled switching means in circuit across the battery, said switching means being actuated to energize said timing means when the charge of the battery reaches a predetermined level.

9. The charging circuit as in claim 6 further including: a second timing means which is automatically energized at periodic intervals to operate for a present period of time; means coupling said second timing means to said charging circuit; and switch means operatively responsive to said timing means for closing the circuit path between the energy source and the battery only when the timing means is energized.

* * * * *